United States Patent [19]

Palmer

[11] Patent Number: 5,444,507

[45] Date of Patent: Aug. 22, 1995

[54] DEVICE FOR COUPLING NIGHT VISION ASSEMBLY TO A VIDEO CAMCORDER

[75] Inventor: Gary L. Palmer, Bellevue, Wash.

[73] Assignee: ITT Corporation, New York, N.Y.

[21] Appl. No.: 216,134

[22] Filed: Mar. 22, 1994

[51] Int. Cl.[6] .................... G03B 11/00; G03B 29/00
[52] U.S. Cl. .................................. 354/82; 354/293; 354/295
[58] Field of Search ............. 354/81, 82, 293, 295; 352/243; 248/187; 348/373, 376

[56] References Cited

U.S. PATENT DOCUMENTS

| 2,505,990 | 5/1950 | Pollock | 354/293 X |
| 4,835,621 | 5/1989 | Black | 354/82 X |
| 5,119,203 | 6/1992 | Hosaka et al. | 354/81 X |

Primary Examiner—Michael L. Gellner
Assistant Examiner—J. K. Han
Attorney, Agent, or Firm—Arthur L. Plevy; Patrick M. Hogan

[57] ABSTRACT

An apparatus and associated method of joining a night vision device to a camera device to record images during night time or low light conditions. The present invention includes a substantially rigid mounting plate that connects to the bottom surfaces of both the night vision device and the camera device, whereby the objective lens assembly of the camera device is held in optical alignment with the ocular lens assembly of the night vision device. As a result, the night vision device and camera device are joined together both physically and optically, while each is also independently supported by the mounting plate. The mounting plate is configured to compensate for size differentials between the night vision device and the camera device. Accordingly, the mounting plate aligns the optical axis of the night vision device with the optical axis of the camera device even if these optical axes normally do not align. An adaptor is used to physically join the ocular lens assembly of the night vision device to the objective lens assembly of the camera device. The adaptor physically engages both the night vision device proximate the ocular lens assembly and the camera device proximate the objective lens assembly. The adaptor includes a stabilizing element that attaches to the mounting plate, thereby providing additional support to both the camera device and the night vision device.

21 Claims, 3 Drawing Sheets

DEVICE FOR COUPLING NIGHT VISION ASSEMBLY TO A VIDEO CAMCORDER

BACKGROUND OF THE INVENTION

I. Field of the Invention

The present invention relates to mounting assemblies that enable a night vision optical assembly to be joined to a commercial video cam recorder. More specifically, the present invention relates to a mounting assembly that joins a night vision optical assembly to a video cam recorder, without modification to the optics of the video cam recorder and alters the position of the video cam recorder's handles and display to compensate for the change in the center of gravity created by the addition of the night vision optical assembly.

II. Prior Art Statement

In the prior art record there are many night vision optical assemblies that enable a person to view a target object during night time or other low light conditions. Most such night vision assemblies are independent units having an objective lens for receiving an image and an ocular lens assembly through which a person can directly view an intensified image. Since such night vision devices are independent units, they typically have either a focusable objective lens assembly and/or a focusable ocular lens assembly, so that a person using the night vision device can adjust the device to meet his/her needs. Furthermore, it is very common for such night vision devices to provide some degree of magnification to the image being viewed.

In addition to objective lens assemblies and ocular lens assemblies, night vision devices typically include an image intensifier tube, a battery source and various electronic components used control the image produced by the night vision device. As a result, night vision devices have significant mass that may exceed 1 kilogram for some models.

In many situations, such as night time photography and night time surveillance, it is desirable to couple a night vision device to a second optical device such as a camera or a video camcorder. However, when connecting such device together, problems result due to incompatible optical designs. In many cameras and video cam recorders, the objective lens assembly is a delicate unit that is coupled to the rest of the assembly only with shallow threads. Consequently, a heavy night vision device cannot be attached to these objective lens assemblies without either damaging the assembly or creating a very fragile unit that requires the utmost care in handling. Since such delicate assemblies are impractical, the delicate objective lens assembly of a camera or video cam recorder is typically removed and the night vision device is connected directly to the housing of the camera or video cam recorder. This type of assembly, however, requires the camera or video cam recorder to rely solely upon the optics of the night vision device to properly focus the intensified image onto the film of the camera or the charged coupled device of the video cam recorder. Often the optical design of the night vision device is incompatible with the optical design of the camera objective lens that it replaces. Consequently, the image received by the film in the camera or the charged coupled device of the video cam recorder is adversely affected. This often results in a very small image being recorded or an image of poor quality being recorded.

In attempt to rectify some of the optical disadvantages of substituting a night vision device in place of the objective lens assembly of a camera or video cam recorder, the prior art has often turned to the use of relay lens assemblies that join the night vision device to the camera or video cam recorder. An example of such a prior art system includes the use of the Model F6010 pocketscope night vision device manufactured by the Electro-Optical Products Division of ITT Corp., the assignee herein. The Model F6010 pocketscope is designed to be used with a custom made relay lens assembly. The relay lens assembly therein connects the Model F6010 pocketscope to a 35 mm SLR camera body where the relay lens assembly and Model F6010 pocketscope replace the objective lens normally used with the camera. The use of a relay lens does correct some of the optical design incompatibilities, however, relay lens assembly add significantly to both the cost and the complexity of the overall assembly.

A need therefore exists in the prior art for a means to couple a night vision device to a camera or video cam recorder in a manner that does not damage the camera, does not require expensive relay lens assemblies and does not detract from the quality of the image being recorded.

SUMMARY

The present invention is an apparatus and associated method of joining a night vision device to a camera device to record images during night time or low light conditions. The present invention includes a substantially rigid mounting plate that connects to the bottom surfaces of both the night vision device and the camera device, whereby the objective lens assembly of the camera device is held in optical alignment with the ocular lens assembly of the night vision device. As a result, the night vision device and camera device are joined together both physically and optically, while each is also independently supported by the mounting plate. The mounting plate is configured to compensate for size differentials between the night vision device and the camera device. Accordingly, the mounting plate aligns the optical axis of the night vision device with the optical axis of the camera device even if these optical axes normally do not align.

An adaptor is used to physically join the ocular lens assembly of the night vision device to the objective lens assembly of the camera device. The adaptor physically engages both the night vision device proximate the ocular lens assembly and the camera device proximate the objective lens assembly. The adaptor includes a stabilizing element that attaches to the mounting plate, thereby providing additional support to both the camera device and the night vision device.

BRIEF DESCRIPTION OF THE DRAWING

For a better understanding of the present invention, reference is made to the following description of an exemplary embodiment thereof, considered in conjunction with the accompanying drawings, in which.

DETAILED DESCRIPTION OF THE INVENTION

Although the present invention can be used in many different applications where it is desirable to connect a night vision device to an optical device, such as a camera or a telescope, the present invention is especially suitable for use in connecting a night vision device to a video cam recorder. Accordingly, the present invention will be described in connection with a video cam recorder.

Figure 1:
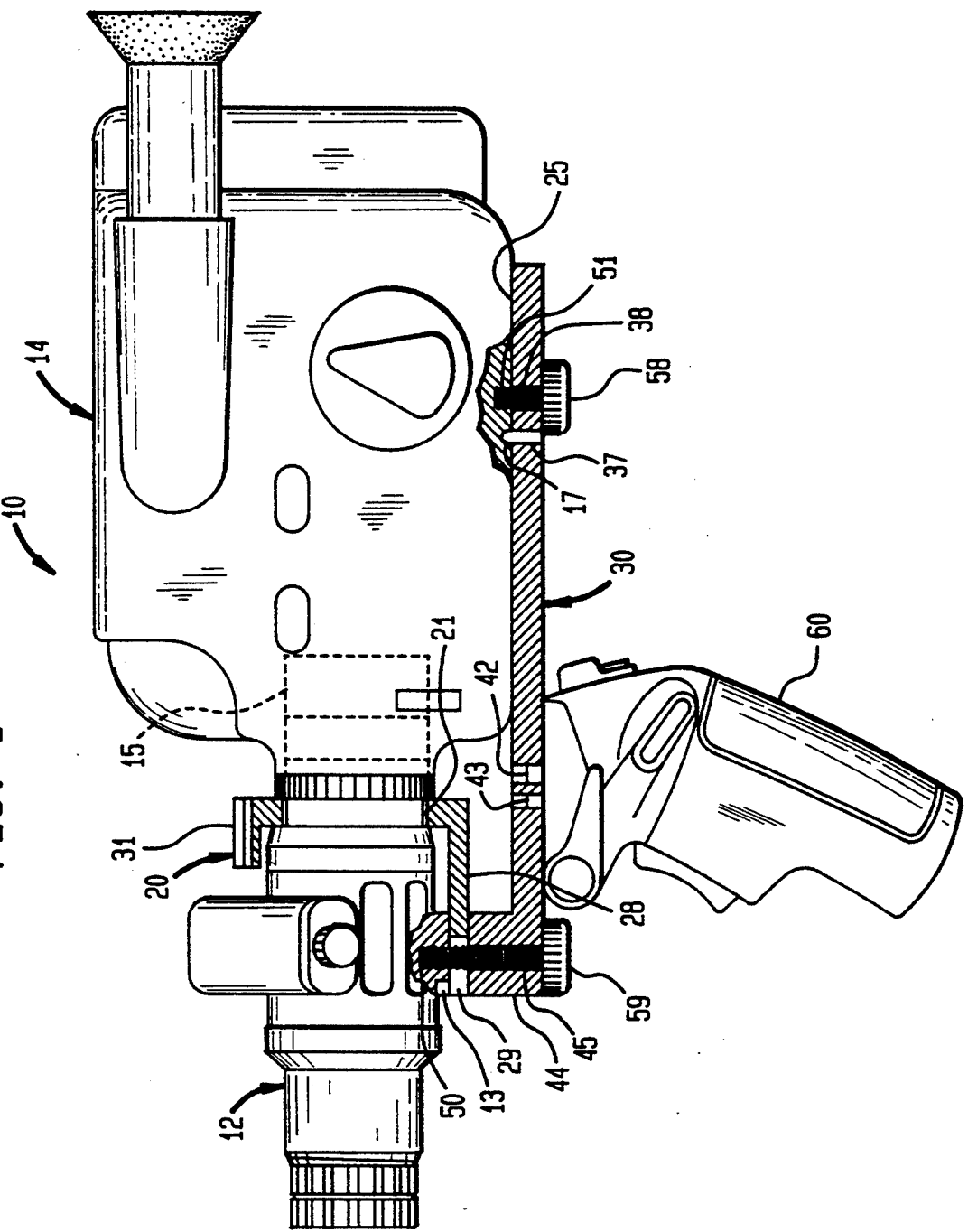
FIG. 1 is a cross sectional side view of one preferred embodiment of the present invention shown in conjunction with a night vision device, video cam recorder and pistol grip to promote consideration and discussion.
Figure 2:
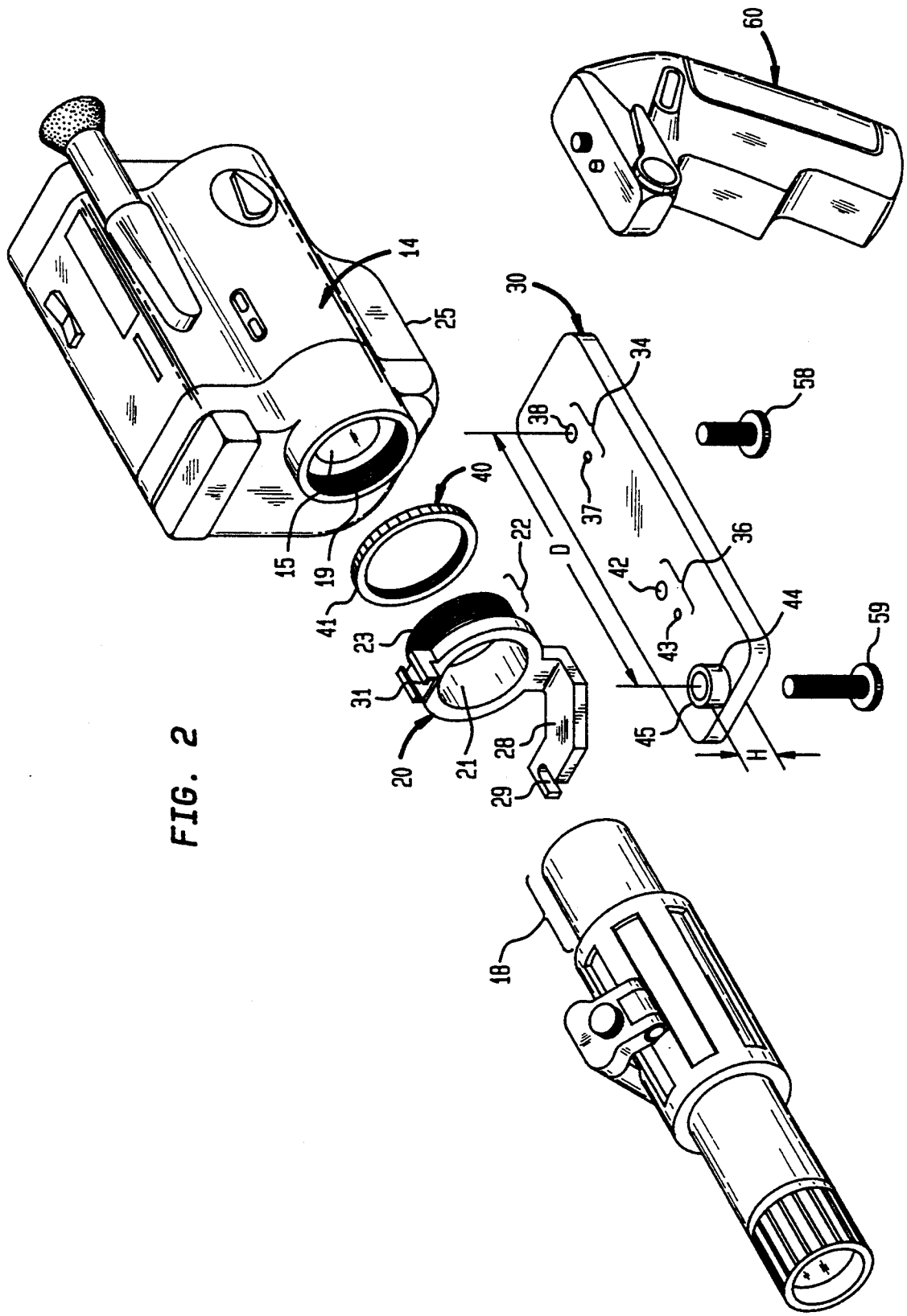
FIG. 2 is an exploded perspective view of the embodiment of the present invention shown in FIG. 1.

Referring to both FIGS. 1 and 2, there is shown a completed assembly 10 wherein a night vision device 12 is connected to a video cam recorder 14. The video cam recorder 14 has an adjustable objective lens assembly 15. In the shown embodiment, the objective lens assembly 15 is contained within the housing 16 of the video cam recorder. However, it will be understood that such a construction is merely exemplary and any type of video cam recorder can be used including those models where the objective lens assembly is external of the video cam recorder's primary housing. Regardless of the design of the video cam recorder 14, it is important to note that the objective lens assembly 15 is not removed or altered. As such, the video cam recorder 14 requires no modifications to use it within the completed assembly 10.

The night vision device 12 can be any commercially available night vision monocular device. However, in the preferred embodiment, the night vision device 12 is the Model F6010 pocketscope manufactured by ITT Corp, the assignee herein. Both the video cam recorder 14 and the night vision device 12 have threaded apertures on their bottom surfaces that are adapted to receive a separate tripod assembly. The threaded apertures for a tripod mount are typically uniform for most optical assemblies, such as cameras, telescopes, night vision devices and video cam recorders, wherein the threaded aperture has a ¼ inch diameter with a 20 tpi thread.

A typical tripod mount also includes a small unthreaded aperture disposed proximate the larger threaded aperture. As will be recognized by a person skilled in the art, when a tripod, pistol grip or other support device is connected to the bottom of an optical device, a small protrusion that extends from the support device enters the small unthreaded aperture. The presence of the protrusion in the unthreaded aperture prevents the optical device from twisting in relation to the support device. Such a prior art tripod mount that includes a large threaded aperture 50 and a small unthreaded aperture 13 is formed on the bottom surface 24 of the night vision device 12. Similarly, such a tripod mount with a large threaded aperture 51 and a small unthreaded aperture 17 is formed on the bottom surface 25 of the video cam recorder 14.

Night vision monocular devices typically have a rubber eyecup that surrounds the ocular lens. In the shown embodiment, the eyecup of the night vision device 12 is removed and the region 18 (FIG. 2) proximate the ocular lens of the night vision device 12 is placed within an adaptor assembly 20. The adaptor assembly 20 defines a central aperture 21 sized to receive the night vision device 12. The distal region 22 of the adaptor assembly 20 has an external thread 23, wherein the distal region 22 and external thread 23 are sized and shaped to threadably engage the video cam recorder 14. Video cam recorders typically have threaded apertures 19 (FIG. 2) surrounding the area of the objective lens assembly 15 to enable supplemental lenses and filters to be joined to the video cam recorder 14. The distal region 22 of the adaptor assembly 20 screws into the threaded aperture 19 of the video cam recorder 14 in the same manner as would such a lens or filter. A stabilizing bracket 28 extends from the bottom of the adaptor assembly 20. a slot 29 is formed in the stabilizing bracket 28 for a purpose which will later be described. A display mount 31 extends from the top of the adaptor assembly 20. The display mount 30 is shaped to receive an electronic display as will also be later described.

A locking ring 40, having a knurled exterior surface 41, is screwed onto the threaded distal region 22 of the adaptor ring assembly 20. As a result, when the adaptor ring assembly 20 is fully threaded into the threaded aperture 19 of the video cam recorder 14, the locking ring 40 can be tightened against the video cam recorder 14 thereby retaining the adaptor ring assembly 20 into one set position relative the video cam recorder 14. With the adaptor ring assembly 20 set into a fixed position, the adaptor ring assembly 20 aligns the optical path of the night vision device 12 with the optical path of the video cam recorder 14. The objective lens assembly 15 of the video cam recorder is therefore directed toward the ocular lens assembly of the night vision device 12.

A mounting plate 30 also connects the night vision device 12 to the video cam recorder 14. Two sets of holes 34, 36 are formed through the mounting plate 30. The first set of holes 34 include a large hole 38 and a small hole 37. The second set of holes 36 also includes two holes 42, 43 that are identical in size and orientation to the first set of holes 34. A spacer 44 extends upwardly near one end of the mounting plate 30. The spacer 44 has a height H and may either be integrally formed as part of the mounting plate 30, as is shown, or the spacer may be a separately formed piece. An aperture 45 is disposed within the spacer 44 that extend completely through the mounting plate 30. The distance D between the center of the spacer aperture 45 and the center of the large hole 37 in the first set of holes 34 is sized to correspond to the threaded apertures 50, 51, in the night vision device 12 and the video cam recorder 14, when joined by the adaptor ring assembly 20. In other words, the threaded aperture 50 on the bottom surface 24 of the night vision device 12 aligns with the spacer aperture 45 in the mounting plate 30, and the threaded aperture 51 on the bottom surface 25 of the video cam recorder 14 aligns with the large hole 38 in the first set of mounting holes 34 when the night vision device 12 is properly oriented and aligned with the video cam recorder 14, via the adaptor ring assembly 20.

The bottom surface 25 of the video cam recorder 14 rest upon the mounting plate 30. A first screw 58 passes through the large hole 38 in the first set of mounting holes 34 and screws into the threaded aperture 51 on the bottom surface 25 of the video cam recorder 14. As a result, the video cam recorder 14 is firmly secured to the mounting plate 30 in a set orientation.

The bottom surface 24 of the night vision device 12 rests upon the stabilizing bracket 28 in such a manner that the threaded aperture 50 on the bottom of the night vision device 12 aligns with the slot 29 formed in the stabilizing bracket 28. The stabilizing bracket 28, in turn, rests upon spacer 44 on the mounting bracket 30 in such a manner that the aperture 45 in the center of the spacer 44 aligns with both the slot 29 on the stabilizing bracket 28 and the threaded aperture 50 on the bottom of the night vision device 12. A second screw 59 passes through the aperture 45 in the center of the spacer 44. The screw 59 extends throughout the spacer 44, past the slot 29 in the stabilizing bracket 28 and screws into threaded aperture 50 on the bottom surface 24 of the night vision device 12. As such, both the night vision device 12 and the stabilizing bracket 28 are firmly secured to the mounting plate 30. As has been previously described, both the night vision device 12 and the video cam recorder 14 are connected via the adaptor ring assembly 20. Accordingly, the optical axis of the night vision device 12 is held in line with the optical axis of the video cam recorder 14, as both are firmly attached to the mounting plate 30.

The distance between the bottom surface 25 of the video cam recorder 14 and the optical axis of the video cam recorder 14 is greater than the distance between the bottom surface 24 of the night vision device 12 and the optical axis of the night vision device 12. Consequently, if the night vision device 12 and the video cam recorder 14 were placed on the same even surface, the optical axis of each would not align. The height H of the spacer 44 is sized to compensate for the size differentials between the night vision device 12 and the video cam recorder 14. The spacer 44 elevates the night vision device 12 so that the optical axis of the night vision device 12 is at the same height as the optical axis of the video cam recorder 14.

The night vision device 12 and the video cam recorder 14 are both firmly secured to the same mounting plate 30, via the screws 58, 59 that pass into the threaded apertures 50, 51 present on the bottoms of the night vision device 12 and the video cam recorder 14. Furthermore, the optical interface connection between the night vision device 12 and the video cam recorder 14 is supported by the stabilizing bracket 28 which is also firmly secured to the mounting plate 30. As a result, it can be seen that the mounting plate 30 independently supports the weight of both the night vision device 12 and the video cam recorder 14. Consequently, there are no substantial stresses created by the weight of the night vision device 12 at the objective lens end of the video cam recorder 14.

An optional pistol grip assembly 60 attaches to the bottom of the mounting plate 30. The pistol grip assembly 60 is a commercially available product that is used in conjunction with many video cam recorders. Traditionally, the pistol grip assembly 60 attaches directly to the video cam recorder 14. However, since the night vision device 12 is coupled to the video cam recorder 14, the center of gravity of the overall assembly has been moved a significant distance forward. The second set of mounting holes 36 in the mounting plate 30 mimic the mounting holes that are present on the bottom of the video cam recorder 14. As a result, the pistol grip assembly 60 may engage the second set of mounting holes 36 in the mounting plate 30 in the same manner as it would engage the video cam recorder directly. By repositioning the pistol grip assembly 60 in such a manner, the pistol grip assembly 60 is now closer to the center of gravity of the overall unit. Consequently, the overall unit is more easily manipulated and balanced by the pistol grip assembly 60.

It will be understood that the use of a pistol grip assembly 60 is merely exemplary and other support structures such as a tripod or the like may be or also be used in place of the pistol grip assembly 60.

With the night vision device 12 joined to the video cam recorder 14 on a common mounting plate 30, the image viewed through the video cam recorder 14 is that produced by the night vision device 12. Typically the night vision device 12 is a stand alone system with an eyepiece focusing mechanism that enables a person to adjust the ocular lens assembly to his or her needs. Since the objective lens assembly 15 is focused upon the ocular lens assembly of the night vision device 12, the ocular lens assembly of the night vision device 12 should be focused close to unit prior to connecting the night vision device 12 to the video cam recorder 14. The objective lens assembly 15 of the video cam recorder 14 is adjustable. As a result, the objective lens assembly 15 of the video cam recorder 14 can be used as a telescopic eyepiece for the optics of the night vision device 12. The objective lens assembly 15 of the video cam recorder 14 can thereby be adjusted to focus the image emanating from the night vision device 12 onto the charged coupled device within the video camera. Consequently no relay lenses or other supplemental optics need to be positioned between the night vision device 12 and the video cam recorder 14. Additionally, the objective lens assembly 15 of the video cam recorder 14 can be focused upon the output of the night vision device 12 in a zoom mode. This enables the image of the night vision device 12 to fill the entire frame being recorded by the video cam recorder 14.

Figure 3:
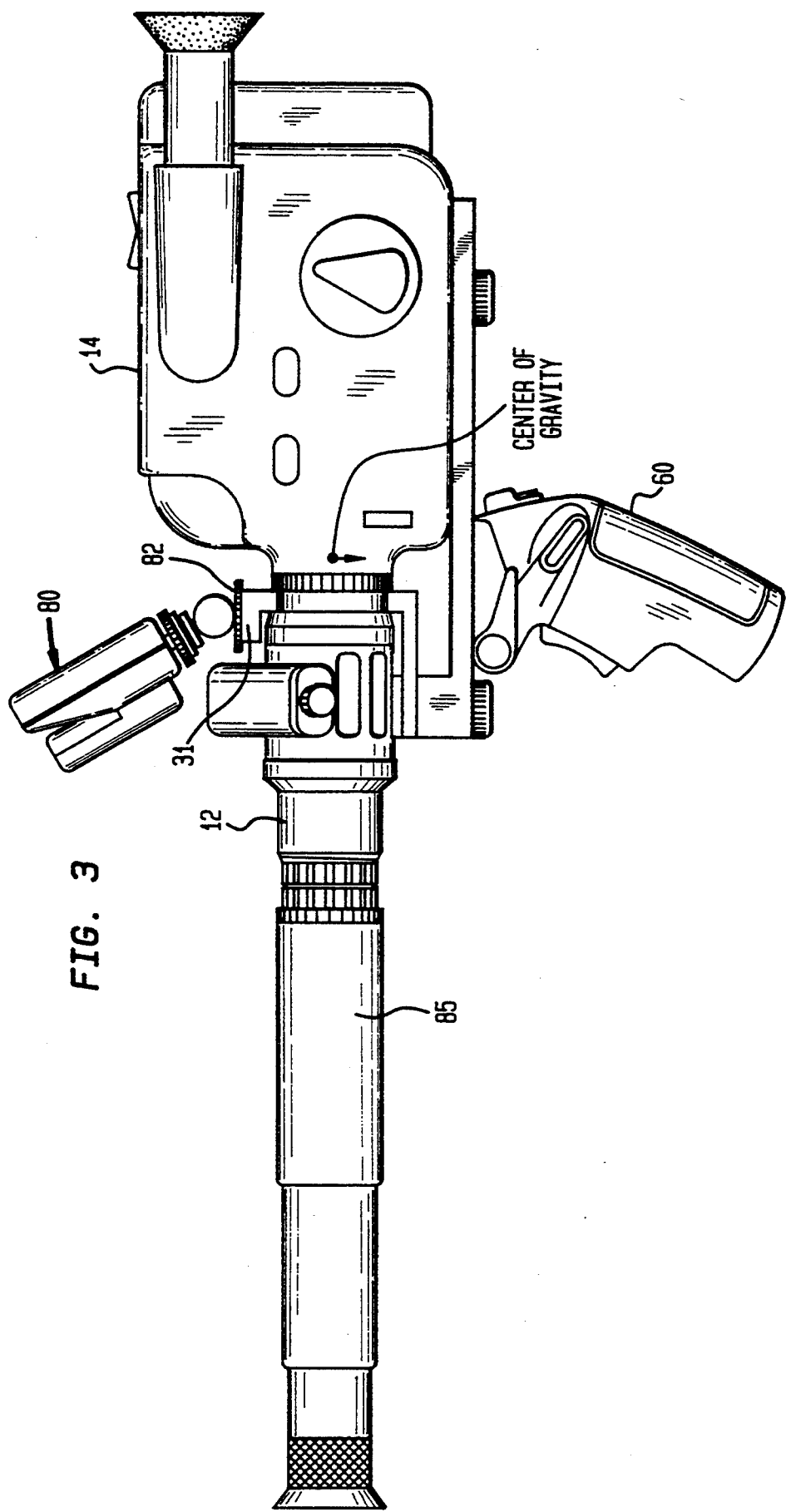
FIG. 3 is a side view of the preference embodiment of FIG. 1 shown in conjunction with an additional telescope lens and a electronic display.

Referring to FIG. 3 optional devices are shown joined to a complete night vision/camera assembly of FIGS. 1 and 2. In this embodiment, a video monitor assembly 80 is attached to display mount 31 of the stabilizing bracket 28. As was previously shown in FIG. 2, the display mount 31 extending from the adaptor ring assembly 20 defines a T-shaped channel. In FIG. 3, it can be seen that the video monitor assembly 80 engages the display mount 31, having a T-shaped member (not shown) that fits within the T-shaped channel. The T-shaped member is locked into the channel by a locking screw 82 that biases the T-shaped member to one side of the channel. The video monitor assembly 80 itself may be a standard accessory to the video cam recorder 14. Alternatively, the video monitor can be a separately purchased device that can be coupled to the video cam recorder 14 via the display mount 31 of the adaptor ring assembly 20. By mounting the video monitor assembly 80 to the stabilizing bracket 28, the weight of the video monitor assembly 80 is transferred directly to the mounting plate 30, thereby providing a strong, stable support.

Since the objective lens assembly 15 of the video cam recorder 14 is focused upon the output of the night vision device 12, the overall assembly is limited to the optical power of magnification built into the night vision device 12. In order to increase this set power of magnification, a supplemental telephoto lens attachment 85 may be joined to the night vision device 12. The forward position of the pistol grip assembly 60 makes the overall assembly much easier to control to compensate for the added weight of the supplemental telephoto lens assembly 85.

It will be understood that the present invention described in conjunction with the various figures are merely exemplary and a person skilled in the art may make numerous variations and modifications to the shown embodiments utilizing functionally equivalent features to those described. All such variations and modifications are intended to be included within the scope of this invention as defined by the appended claims.

What is claimed is:

1. An apparatus for joining a night vision device to a camera device wherein the night vision device has an ocular lens assembly and the camera device has an objective lens assembly, comprising:
   a mounting plate;
   first attachment means for attaching the camera device to said mounting plate, wherein said mounting plate supports the camera device in a first predetermined position;
   second attachment means for attaching the night vision device to said mounting plate, wherein said mounting plate supports the night vision device at a second predetermined position whereby the ocular lens assembly of the night vision device is optically aligned with the objective lens assembly of the camera device; and
   coupling means extending from said mounting plate for directly coupling the night vision device proximate the ocular lens assembly to the camera device proximate the objective lens assembly.

2. The apparatus according to claim 1, wherein said mounting plate includes a support mounting for connecting a support element to said mounting plate, whereby the support element supports the mounting plate and both the night vision device and camera device thereon.

3. The apparatus according to claim 1, wherein the night vision device has a bottom surface and the camera device has a bottom surface and said first attachment means attaches the bottom surface of the camera device to the mounting plate and said second attachment means attaches the bottom surface of the night vision device to said mounting plate.

4. A night vision camera assembly, comprising:
   a substantially rigid mounting plate;
   a camera device having an objective lens assembly wherein the camera device is joined to said mounting plate in a set orientation;
   a night vision device having an ocular lens assembly, wherein the night vision device is joined to said mounting plate at an orientation whereby the ocular lens assembly of the night vision device is optically aligned with said objective lens assembly of the camera device; and
   a stabilizing element affixed to said mounting plate, said stabilizing element engaging the ocular lens assembly of the night vision device and the objective lens assembly of the camera device, thereby stabilizing the ocular lens assembly and the objective lens assembly with respect to said mounting plate.

5. The assembly according to claim 4, wherein said mounting plate includes an attachment means thereon for attaching said mounting plate to a support device, wherein said mounting plate supports the camera device and the night vision device on the support device.

6. The assembly according to claim 4, wherein said stabilizing element has a display mount disposed thereon, whereby a display can be coupled to said stabilizing element via said display mount.

7. The assembly according to claim 4, wherein the height of the optical path associated with the night vision device is different from the height of the optical path associated with the camera device and the mounting plate includes at least one vertical spacer thereon that aligns the optical path of the night vision device with the optical path of the camera device as the night vision device and the camera device are attached to said mounting plate.

8. The assembly according to claim 4, wherein the night vision device has a bottom surface that includes a threaded aperture and the camera device has a bottom surface that includes a threaded aperture and said mounting plate includes apertures that align with the threaded aperture of the night vision device and the threaded aperture of the camera device, whereby said mounting plate is coupled to the camera device and the night vision device by threaded fasteners that pass through the apertures in said mounting plate and screw into the night vision device and the camera device, respectively.

9. The assembly according to claim 4, wherein the ocular lens assembly of the night vision device is focused generally at an infinite conjugate.

10. The assembly according to claim 4, wherein the camera device is a video cam recorder and the objective lens assembly is adjustable through a predetermined range of focus.

11. A method of joining a night vision device to a camera device comprising the steps of:
    mounting the camera device to a generally rigid mounting plate;
    mounting the night vision device to said mounting plate wherein the ocular lens assembly associated with the night vision device is optically aligned with the objective lens assembly associated with the camera device, whereby the weight of the camera device and the night vision device are supported substantially by said mounting plate; and
    coupling the night vision device, proximate the ocular lens assembly directly to the camera device proximate the objective lens assembly with an intermediate rigid member, wherein said intermediate rigid member is supported by said mounting plate.

12. The method according to claim 11 further including the step of focusing the ocular lens assembly at a substantially infinite conjugate.

13. The method according to claim 11 further including the step of focusing the objective lens assembly of the camera device at the ocular lens assembly of the night vision device.

14. The method according to claim 11 wherein the mounting of the camera device and the night vision device to said mounting plate creates an assembly with a predetermined center of gravity and said method further includes the step of providing a support member on said mounting plate at a point generally below the center of gravity.

15. The method of claim 11, wherein said step of coupling the night vision devices, proximate the ocular lens assembly directly to the camera device, proximate the objective lens assembly further includes securing said intermediate rigid member to said mounting plate.

16. In a video cam recorder having a video display that can be separated from the primary housing, an adaptor assembly for coupling a night vision device to the video cam recorder wherein said adaptor assembly includes:
    a substantially rigid mounting plate;
    first means for engaging the video cam recorder;

second means for engaging the night vision device, wherein said adaptor assembly optically aligns the night vision device with the video cam recorder;

a mounting element adaptor to receive the video display wherein said mounting element supports the video display on said adaptor assembly; and coupling means for directly coupling the night vision device to the video cam recorder, wherein said coupling means is supported by said rigid mounting plate.

17. The adaptor assembly according to claim 16, wherein the video cam recorder has a threaded objective aperture and said second means includes a threaded region that screws into the threaded objective aperture, thereby joining said adaptor assembly to the video cam recorder.

18. The adaptor assembly according to claim 17, wherein the night vision device has a cylindrical outer surface proximate its ocular end and said first means includes an annular member that passes around the cylindrical outer surface, thereby joining the adaptor assembly to the night vision device.

19. The adaptor assembly according to claim 17, further including a locking ring that threadably engages said threaded region and locks said adaptor assembly into a set position relative the threaded objective aperture of the video cam recorder.

20. The adaptor assembly according to claim 16, wherein the video display has a T-shaped mounting extension and said mounting element includes a T-shaped slot to receive and retain the mounting extension therein.

21. The adapter assembly according to claim 16 wherein said coupling means is selectively attachable to said mounting plate.

* * * * *